May 12, 1970   C. VAN DER LELY   3,510,958
CROP DRIERS
Filed May 2, 1968   2 Sheets-Sheet 1
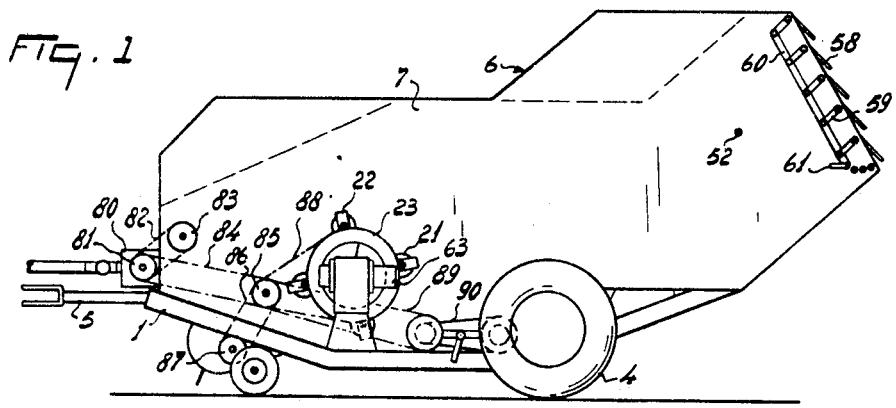
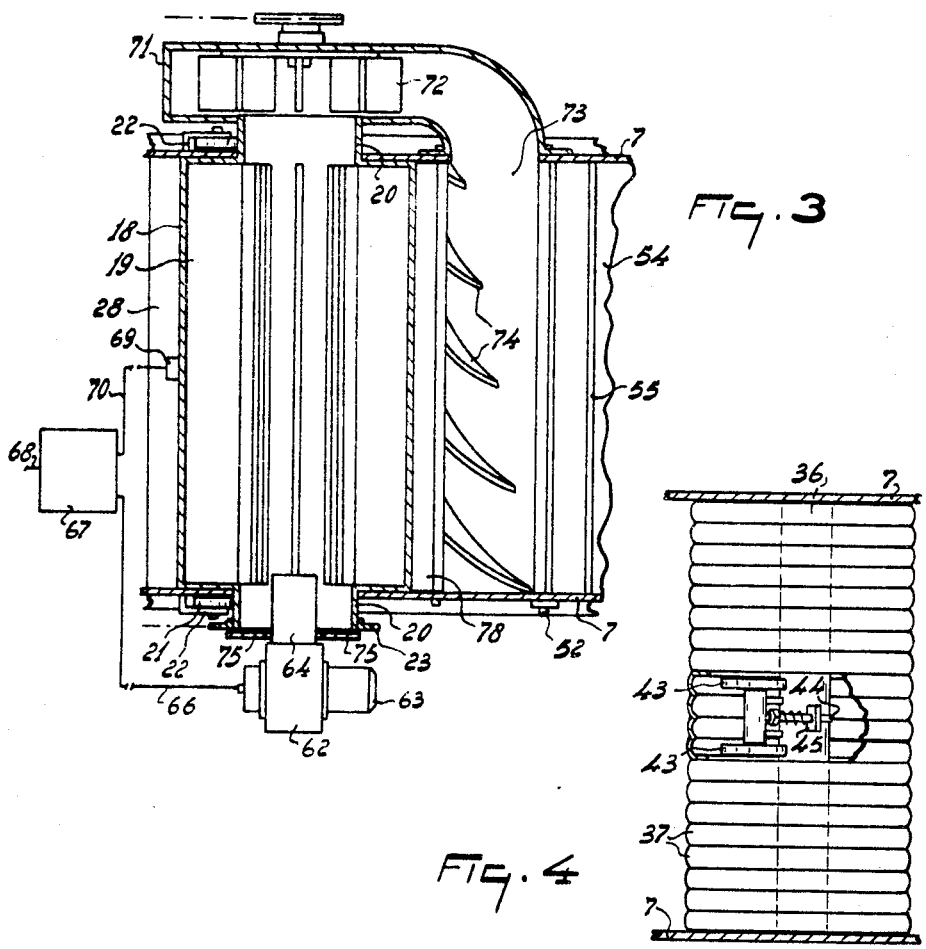
INVENTOR
CORNELIS VAN DER LELY
BY
Mason, Mason & Albright
Attorneys

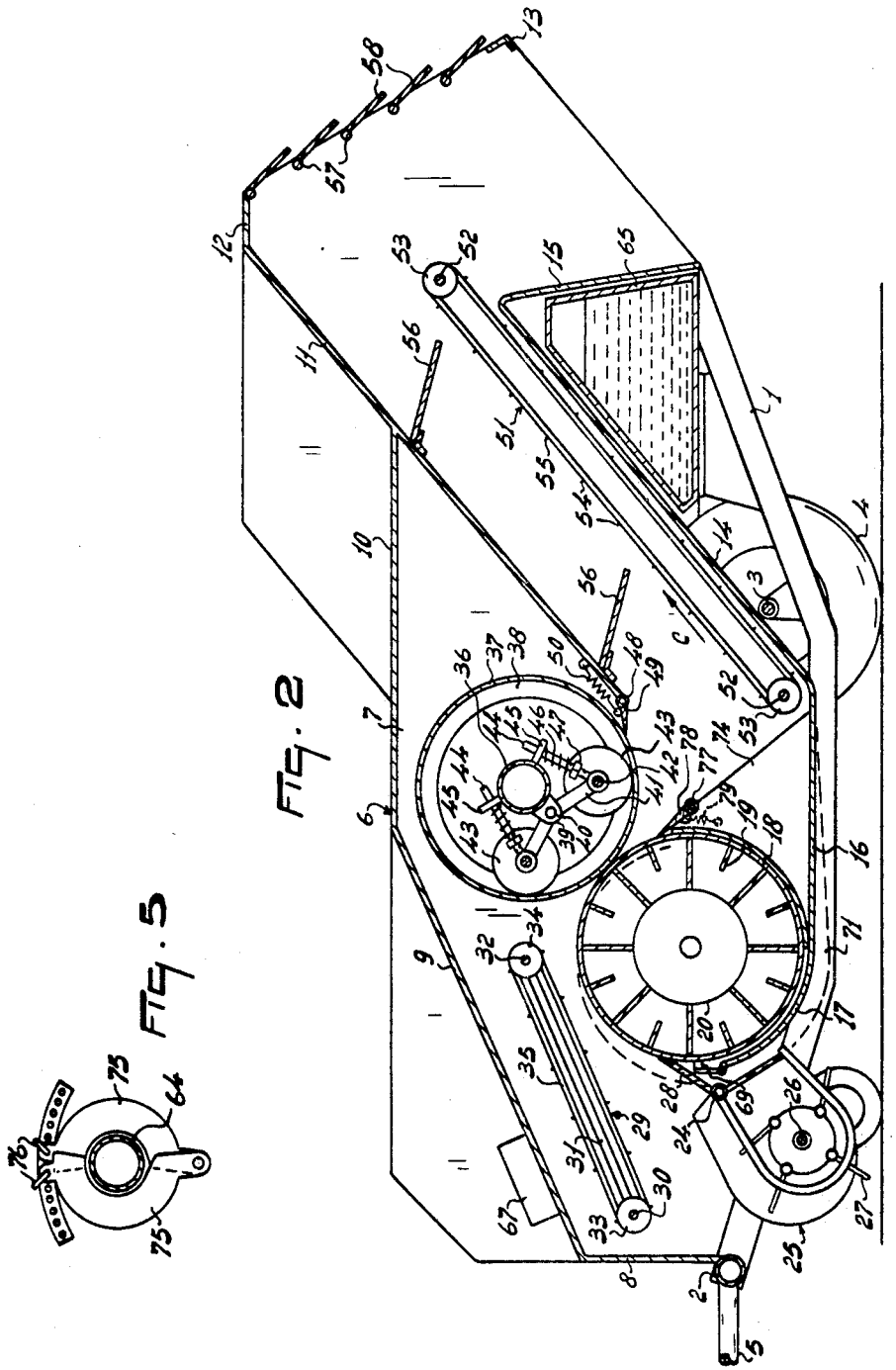

United States Patent Office 3,510,958
Patented May 12, 1970

3,510,958
CROP DRIERS
Cornelis van der Lely, 7 Bruschenrain,
Zug, Switzerland
Filed May 2, 1968, Ser. No. 726,049
Claims priority, application Netherlands, May 9, 1967,
6706441
Int. Cl. F26b 19/00
U.S. Cl. 34—60                                                    43 Claims

ABSTRACT OF THE DISCLOSURE

A transportable crop drier with a pick-up device for picking up crop and a conveyor mechanism that moves crop through the drier. Opposing rotatable drums, at least one of which is heated, are mounted in the path of moving crop. The drums can be adjusted to crush the crop moving between them. Heated air is passed into contact with the crop being processed as it moves through the drier.

According to a first aspect of the present invention there is provided a crop drier comprising a burner arranged near an end of a drum along which crop to be dried is conveyed in operation, and a blower arranged near an end of the drum for producing an air stream across the drum.

According to a second aspect of the present invention there is provided a transportable crop drier comprising a pick-up member for picking up the crop; relatively co-operating crushing rollers by means of which the crop can be crushed in operation; and means for heating one of the crushing rollers.

According to a third aspect of the present invention there is provided a crop drier comprising two drums between which crop to be dried is passed in operation, one of the drums being formed by a plurality of portions which are capable of deflecting independently of each other with respect to the other drum.

According to a fourth aspect of the present invention there is provided a crop drier comprising means for heating crop to be dried; two drums between which crop to be dried is passed in operation and at least one of which is heated in operation; conveying means associated with the drums for conducting away the crop emanating from between the drums; and means for passing air in the direction in which the crop is transported.

For a better understanding of the invention and to show how the same may be carried into effect, reference will now be made, by way of example, to the accompanying drawings, in which:

BRIEF DESCRIPTION OF THE DRAWINGS

FIG. 1 is a diagrammatic side view of a crop drier,
FIG. 2 is a sectional side view on a larger scale of the drier of FIG. 1,
FIG. 3 is a sectional plan view of part of the drier of FIGS. 1 and 2, showing a drum with a burner and a blower associated herewith,
FIG. 4 is a plan view, partly broken away and in section, of a second drum of the drier of FIGS. 1 and 2, and
FIG. 5 is a side view of a mechanism for controlling supply of air in the drier of FIGS. 1 to 4.

DESCRIPTION OF THE PREFERRED EMBODIMENT

The crop drier shown in the figures, which is transportable, has a frame comprising two frame beams 1 extending in the longitudinal direction of the drier and interconnected at the front of the drier by a transverse beam 2 and near the center by a shaft 3. Ground wheels 4 are mounted so as to be freely rotatable at the ends of the shaft 3 and a drawbar 5 is secured to the transverse frame beam 2.

The frame beams 1 and 2 support a superstructure 6 having two sidewalls 7. At the front of the drier the two sidewalls 7 are interconnected by a wall 8 extending vertically upwards from the frame beam 2 and terminating, at a distance above the frame beam 2, in a wall 9. The wall 9 extends from the wall 8 at an angle of about 25° obliquely upwards and rearwards to join a wall 10 interconnecting the upper edges of the walls 7. The wall 10 extends from the upper edge of the wall 9, to the rear, to a plate 11. The plate 11 extends at an angle of about 40° upwards and rearwards from the wall 10 between the walls 7 from a point at a distance below the plate 10 to a point at a distance above the plate 10 and terminates at the upper end in a horizontal plate 12 also disposed between the walls 7. From the rear of the plate 12 the edges of the walls 7 extend at an angle of about 60° obliquely to the rear in downward direction. The lower ends of these edges of the walls 7 are interconnected by an angle-section iron 13 extending between the sidewalls 7. At a distance beneath the plate 11 and between the walls 7, a plate 14 extends parallel to the plate 11. The plate 14 joins at its upper edge a plate 15 which extends from the plate 14 obliquely to the rear in downward direction between the sidewalls 7. The lower edge of the plate 14 joins a horizontal plate 16, located between the sidewalls 7 and terminating at a distance in front of the lower edge of the plate 14 in a curved plate 17 between the sidewalls 7.

The curved plate 17 is concentric with the longitudinal axis of a metal drum 18 mounted, for rotation about its longitudinal axis, between the sidewalls 7. The longitudinal, rotary axis of the drum 18 extends horizontally at right angles to the longitudinal direction of the drier. In its interior the drum 18 is provided with radial metal plates or ridges 19, extending in the longitudinal direction of the drum. The ends of the drum 18 are formed as ducts 20. The outer peripheries of the ducts 20 engage rollers 21, which are rotatably mounted in supports 22 secured to the sidewalls 7, so that the drum 18 is centered by the rollers 21. One of the ducts 20 is provided with a toothed rim 23 which serves for driving the drum 18 as will be described more fully hereinafter.

By means of a shaft 24, located in front of the drum 18 and extending parallel to the rotary axis thereof, a ground-wheel supported pick-up member 25 is pivoted to the walls 7. The pick-up member 25 consists of a drum having a central shaft 26 and carrying resilient tines 27. Near the shaft 24, between the walls 7, a plate 28 extends from the shaft 24 obliquely upwards to the proximity of the periphery of the drum 18.

Above the pick-up member 25 and the drum 18 a conveyor 29 extends, viewed from one side of the drier, from the vertical plane through the front of the pick-up member 25 to near the vertical plane through the rotary axis of the drum 18. The conveyor 29 consists of a shaft 30, extending parallel to the rotary axis of the drum 18 and journalled in bearings secured to the walls 7. Beams 31 are freely rotatable on the shaft 30. A shaft 32 is freely rotatable in bearings secured to the ends of the beams 31 remote from the shaft 30. The shafts 30 and 32 are provided with rollers 33 and 34 respectively around which an endless belt 35 with catches is passed. The conveyor 29 is held in the position shown by means of a spring mechanism (not shown), but, if necessary, it can turn resiliently about the shaft 30 under the action of forces exerted from without on the conveyor.

At a distance above and behind the drum 18 a pipe 36 is arranged between the walls 7. The longitudinal axis of this pipe 36 extends parallel to the rotary axis of the drum 18. The line of connection between the rotary axis of the drum 18 and the longitudinal axis of the pipe 36 extends, as viewed in FIG. 2, from the rotary axis of the drum 18 at an angle of about 45° obliquely upwards to the rear. The pipe 36 is surrounded by five adjacent rings 37 which together form a drum. The rings 37 have a corrugated surface and are provided with inwardly directed flanges 38 extending at right angles to the longitudinal axis of the pipe 36.

For each ring the pipe 36 is provided with two ears 39 receiving a shaft 40 extending parallel to the pipe 36. Four arms 41, extending pairwise in opposite directions, are freely rotatable about the shaft 40. The ends of each pair of arms 41 remote from the shaft 40 accommodate a shaft 42 extending parallel to the shaft 40. Supporting rollers 43 are freely rotatable about the ends of the shaft 42. The side faces of the supporting rollers 43 bear on the flanges 38 and the periphery of each supporting roller 43 is in contact with the inner periphery of one or other of the rings 37. The shafts 42 have furthermore pivoted to them the ends of coupling rods 44 which pass through holes provided in supports 45 secured to the pipe 36. The portion of each coupling rod 44 located between one of the shafts 42 and the corresponding support 45 is surrounded by a compression spring 46. The ends of the compression springs 46 remote from the supports 45 bear on nuts 47 screwed onto the rods 44. By turning the nuts 47 the compression of the springs 46 can be varied.

It will be appreciated that the rollers 43 and the springs 46 coupled therewith tend to hold the rings 37 in the position shown in FIG. 2 and to urge the rings, in addition, with a force dependent upon the extent to which the springs are compressed, against the outer periphery of the drum 18. The various rings 37 are capable of deflecting independently of each other in a direction normal to the longitudinal direction of the pipe 36.

By means of a shaft 48, secured to the lower edge of the plate 11, five plates 49 are pivoted to the plate 11. With the aid of springs 50 the free ends of the plates 49 are urged against the outer peripheries of the rings 37 so that in operation the plates 49 serve as scrapers.

The channel formed by the space between the plates 11 and 14 accommodates a conveyor 51 extending upwardly along the plate 14. The conveyor 51 consists of two shafts 52 extending horizontally and transversely of the longitudinal direction of the drier and having secured to them rollers 53. Around the rollers 53 is passed an endless belt 55 provided with catches 54. The plate 11 is provided with guide blades 56 extending between the sidewalls 7 from the plate 11 obliquely to the rear and downwards towards the conveyor 51.

Between the rear edge of the plate 12 and the angle-section iron 13 five horizontal shafts 57 extend at right angles to the longitudinal direction of the drier, so as to be rotatable in bearings secured to the sidewalls 7. The shafts 57 are provided with blades 58 which extend from the shafts in downward direction between the sidewalls 7. To the ends of the shafts 57 are secured arms 59 (FIG. 1) which are interconnected by a track rod 60. The track rod 60 can be fixed in different positions by means of a locking pin 61. The blades 58 can be moved into such a position that the lower end of each blade but the lowest bears on the upper end of a subjacent blade, in which position of the blades the opening between the plate 12 and the angle-section iron 13 is completely closed by the blades 58.

Near the duct 20 with the toothed rim 23 a blower 62 (FIG. 3) is arranged. It is driven by means of an electric motor 63. The outlet duct 64 of the blower 62, whose longitudinal axis coincides with the rotary axis of the drum 18, accommodates a burner (not shown).

Through a pipe (not shown) fuel can be fed to the burner from a fuel tank 65 disposed between the plates 14 and 15. The electric motor 63 is connected through a cable 66 to a switch box 67, to which is furthermore connected a current supply cable 68. A feeler 69, which is in contact with the periphery of the drum 18, is connected through a cable 70 to the switch box 67.

The duct 20 remote from the burner in the outlet duct 64 of the blower 62 communicates with the opening in a blower housing 71 in which an impeller 72 is arranged. The blower housing 71 communicates with a channel 73 extending along the drum 18 between the walls 7 and and accommodating guide partitions 74 for the air blown therealong.

The passage formed by the duct 20 around the outlet duct 64 of the blower 62 may be closed to a desired extent by means of screens 75 (FIG. 5) which are pivoted to a side wall 7 and which can be fixed in different positions by means of locking pins 76.

A plate 78 extends along the upper part of the channel 73, the plate 78 being pivotally supported by a shaft 77 extending parallel to the rotary axis of the drum 18. The free edge of the plate 78 is urged against the periphery of the drum 18 by means of a spring 79 (FIG. 2).

Various parts of the drier are driven with the aid of a gear box 80 at the front of the drier as follows. A shaft located partly in the gear box 80 is provided with a double sprocket 81. By means of a first chain 82 the sprocket 81 is coupled with a sprocket 83 secured to the shaft 30 of the conveyor 29. By means of a second chain 84 the sprocket 81 is coupled with one of four sprockets 85 on the shaft 24. One of the sprockets 85 is linked by a third chain 86 to a sprocket 87 on the shaft 26 of the pick-up member 25. A further sprocket is linked by means of a fourth chain 88 to the toothed rim 23. One of the sprockets 85 on the shaft 24 is linked by a fifth chain 89 to one of the pulleys of a continuously adjustable change-speed gear 90 through which the conveyor 51 is driven.

For operation the drier can be attached by means of the drawbar 5 to a tractor or a similar vehicle. The gear wheel transmission of the gear box 80 may be connected with the aid of an auxiliary shaft, to the power take-off shaft of the tractor. The current supply cable 68 may be coupled with a current source provided on the tractor. The blower 62 and the burner associated therewith can be actuated with the aid of the switch box 67 so that the drum 18 and the ridges 19 inside this drum are heated. When the drier is travelling over the field, the crop lying on the ground is gathered by the pick-up member 25 and is shifted to the rear along the plate 28. The crop is passed between the conveyor 29 and the outer periphery of the drum 18 to the rear and then passed between the drum 18 and the drum formed by the rings 37. The crop is crushed by the corrugated surface of the rings 37 and the pressure by which the rings 37 are urged against the drum 18, so that moisture contained in the crop is readily released. The drums 18 and 37 thus serve at the same time as crushing rollers. During its travel along the drum 18 the crop is dried. The air displaced by the blower 62 and the air drawn-in by the impeller 72 through the outlet duct 20 is blown away through the channel 73. The crop passed between the drums 18 and 37 is blown to the rear and drops onto the conveyor 51 by means of which it is conveyed upwards and rearwards in the direction of the arrow C (FIG. 2). The hot air traverses the crop so that it is further dried. The plates 56 guide the air so that it is compelled to pass through the layer of crop on the conveyor 51. The scraper plates 49 and 78 prevent the crop from sticking to the drums 18 and 37. The air stream across the drier may be modified by changing the position of the blades 58. The crop drops from the end of the conveyor 51 onto the ground. The crop thus dried can then be picked up, for example, by a baler or a wagon. In the case of very humid crop it may be desirable to pass it a second time through the drier.

The contact 69 measures the temperature of the drum 18 and transmits a signal to the switch box 67. If the temperature of the wall of the drum 18 becomes excessively high, the fuel supply to the burner is stopped so that the drum 18 is heated no longer. The air stream produced by the blowers, however, is maintained. Since the heat accumulated in the drum 18 and the plates inside the drum 18 is transferred to the air passing through the drum 18 and to the crop moving along the drum 18, the temperature of the wall of the drum 18 drops gradually, while the drying process continues. If the temperature of the drum drops below a predetermined value, the burner is automatically switched on again.

Having thus described my invention, what I claim as new and desire to secure by Letters Patent of the United States is:

1. A crop drier comprising a frame, heating means and at least one rotatable drum supported by said frame, said drum being heated by said heating means, conveying means for moving crop in a path through said drier in contact with the exterior of said heated drum, said heating means including blower means mounted at one end of said drum comprising a source for a stream of heated air which is blown through the interior of said drum within said drier and is thereafter directed at least in part at said crop moving in said path externally of said drum.

2. A crop drier as claimed in claim 1, wherein impeller means is mounted adjacent the opposite end of said drum from the source of heated air for circulating said heated air through said drier.

3. A drier as claimed in claim 1, wherein said drier is mounted on wheels to be transportable, the forward end of said drier being provided with a pick-up member for picking up crop during operation.

4. A transportable crop drier comprised of a frame and a crop pick-up member supported on said frame, means for moving crop through said drier in a defined path, cooperating crushing rollers for crushing crop located along the crop path, one of said rollers being heated, said headed crushing roller comprising a holder drum arranged to be heated by a source of heated air and said source being positioned at one end of said heated roller.

5. A drier as claimed in claim 4, wherein said crushing rollers are arranged directly behind said pick-up member so that crop initially picked up by the pick-up member and directly fed to said crushing rollers.

6. A drier as claimed in claim 4, wherein said heated drum is a combustion chamber with blower means at one end thereof.

7. A drier as claimed in claim 6, wherein said blower means blows heated air through said drum and an impeller assists to circulate heated air above the crop path.

8. A drier as claimed in claim 7, wherein an air inlet port is provided for the interior of said heated drum near said blower.

9. A drier as claimed in claim 8, wherein adjusting means is included in said air inlet port whereby the amount of heated air circulated to the crop is adjustable.

10. A drier as claimed in claim 8, wherein guide means is provided for guiding heated air from said impeller into contact with the crop passing through said drier.

11. A drier as claimed in claim 8, wherein the crop path extends between said crushing rollers and said rollers comprise two drums having axes extending transversely to the direction of travel of the drier.

12. A crop drier comprising a frame and means for moving crop in a path through said drier, said path including a passage between two opposing rotatable drums, one of said drums being comprised of a plurality of portions, each portion being adapted to move independently of the other portions in response to the amount of crop passing between said drums.

13. A crop drier comprising a frame and means for moving crop in a path through said drier, said path including a passage between two opposing rotatable drums, one of said drums being comprised of a plurality of adjacent rings which are independently movable responsive to the amount of crop passing between said drums.

14. A drier as claimed in claim 13, wherein said rings have flanges at their ends which extend substantially perpendicular to the rotary axis of said one drum.

15. A drier as claimed in claim 14, wherein a spring mechanism urges said rings against the outer periphery of the other drum opposing said one drum.

16. A drier as claimed in claim 15, wherein the force exerted by said spring mechanism on said rings is adjustable.

17. A drier as claimed in claim 13, wherein roller means is mounted inside the rings, said roller means being urged by springs against the inner peripheries of said rings.

18. A drier as claimed in claim 17, wherein said roller means is coupled with a support located inside said rings and said support occupies a fixed position relative to said frame.

19. A drier as claimed in claim 18, wherein each ring cooperates with four rollers of said roller means which are arranged in two groups of adjacent pairs, one behind the other.

20. A drier as claimed in claim 19, wherein each group of rollers is pivoted to an arm connected to said support.

21. A crop drier comprising a frame and means for moving crop through said drier, means for heating crop passing through said drier, two opposing rotatable drums being included in said drier, at least one drum being heated and said crop passing between said drums during operation, conveying means associated with said drums for conducting away the crop passing between said drums and impeller means for passing heated air in the general direction in which the crop is moved through said drier.

22. A drier as claimed in claim 21, wherein heated air is displaced by impeller means and said impeller means is located at one end of said heated drum to withdraw heated air from the interior of said heated drum.

23. A drier as claimed in claim 22, wherein said impeller means is contained in a housing which communicates with a channel and the heated air is guided through said channel along the rear of said heated drum.

24. A drier as claimed in claim 23, wherein said channel is located between said heated drum and a pick-up end of a discharge conveyor of said conveying means.

25. A drier as claimed in claim 24, wherein said conveyor extends obliquely upwards.

26. A drier as claimed in claim 24, wherein said conveyor is an endless belt.

27. A drier as claimed in claim 24, wherein said conveyor is mounted in a passageway which has guide partitions for heated air.

28. A drier as claimed in claim 24, wherein adjustable guide blades are positioned adjacent one end of the conveyor for guiding heated air over crop being conveyed.

29. A drier as claimed in claim 24, wherein scrapers are mounted adjacent said drums for wiping off crop sticking to said drums.

30. A drier as claimed in claim 29, wherein the scraper cooperating with said heated drum is located adjacent the path of crop emerging from between said drums.

31. A drier as claimed in claim 30, wherein said scraper is located adjacent said channel.

32. A drier as claimed in claim 21, wherein the rotary axes of said opposing drums are located one behind the other.

33. A drier as claimed in claim 32, wherein said rotary axes are located in a plane extending at an angle of about 45° obliquely upwards to the rear of said drier.

34. A drier as claimed in claim 21, wherein a first conveyor is mounted in said drier above a crop pick-up member, and the first of said rotating drums is located behind said pick-up member whereby crop picked up is moved between said first conveyor and the first of said drums.

35. A drier as claimed in claim 34, wherein one end of said first conveyor is located adjacent the vertical plane passing through the rotary axis of said first drum.

36. A drier as claimed in claim 35, wherein said first conveyor is movable in a vertical direction.

37. A drier as claimed in claim 21, wherein a thermostat is mounted adjacent the heated drum to monitor its temperature.

38. A drier as claimed in claim 37, wherein said thermostat is coupled with a switching mechanism whereby heat is discontinued when the temperature of said heated drum exceeds a set amount.

39. A drier as claimed in claim 38, wherein said switching mechanism operates responsive to said thermostat when the temperature drops below a set value.

40. A drier as claimed in claim 21, wherein the outer periphery of at least one of said drums is corrugated.

41. A drier as claimed in claim 21, wherein at least one drum isprovided internaly with ridges.

42. A drier as claimed in claim 21, wherein the diameter of at least one of said drums is at least 50 cms.

43. A crop drier comprising a frame and at least one rotatable drum supported by said frame, said drum being heated, conveying means for moving crop in a path through said drier in contact with said heated drum, blower means mounted at one end of said drum comprising a source for a stream of heated air which is blown across said drum within said drier, said conveying means including a first conveyor to feed crop to said heated drum and a discharge conveyor to receive crop from said drum and to move said crop to the rear of said drier.

References Cited

UNITED STATES PATENTS

| 2,102,607 | 12/1937 | Baker | 34—12 |
| 2,465,070 | 3/1949 | Demuth | 34—60 X |

JOHN J. CAMBY, Primary Examiner